(12) United States Patent
Hawkins et al.

(10) Patent No.: US 7,461,726 B2
(45) Date of Patent: Dec. 9, 2008

(54) FORCE DIVERSION APPARATUS AND METHODS

(75) Inventors: Gary F. Hawkins, Torrance, CA (US); Ching-Yao Tang, Alhambra, CA (US)

(73) Assignee: The Aerospace Corporation, El Segundo, CA (US)

( * ) Notice: Subject to any disclaimer, the term of this patent is extended or adjusted under 35 U.S.C. 154(b) by 207 days.

(21) Appl. No.: 11/066,109

(22) Filed: Feb. 25, 2005

(65) Prior Publication Data

US 2007/0068755 A1    Mar. 29, 2007

(51) Int. Cl.
*F16F 7/12*   (2006.01)
(52) U.S. Cl. .............. 188/371; 267/139; 267/116; 89/36.05; 296/187.07
(58) Field of Classification Search .......... 188/371, 188/372, 377; 267/139, 116, 140, 141; 293/134, 293/135, 136; 296/187.03, 187.07, 187.12; 280/751, 784; 89/36.05
See application file for complete search history.

(56) References Cited

U.S. PATENT DOCUMENTS

| | | | | |
|---|---|---|---|---|
| 3,809,420 A | * | 5/1974 | Weller | 293/121 |
| 3,871,636 A | * | 3/1975 | Boyle | 267/140 |
| 3,964,208 A | * | 6/1976 | Renner et al. | 49/502 |
| 4,054,312 A | | 10/1977 | Strader, Jr. | |
| 4,357,041 A | | 11/1982 | Farris | |
| 4,624,880 A | | 11/1986 | Goulding et al. | |
| 4,681,302 A | | 7/1987 | Thompson | |
| 4,707,872 A | | 11/1987 | Hessel | |
| 4,923,057 A | | 5/1990 | Carlson et al. | |
| 4,948,442 A | | 8/1990 | Manns | |
| 5,019,439 A | | 5/1991 | Momose | |
| 5,044,030 A | | 9/1991 | Balaton | |
| 5,083,778 A | | 1/1992 | Douglass | |
| 5,128,200 A | | 7/1992 | Colley et al. | |
| 5,138,776 A | | 8/1992 | Levin | |
| 5,217,787 A | | 6/1993 | Monahan | |
| 5,251,414 A | * | 10/1993 | Duke | 52/309.16 |
| 5,254,387 A | | 10/1993 | Gallucci | |
| 5,256,223 A | | 10/1993 | Alberts et al. | |
| 5,299,807 A | | 4/1994 | Hutin | |
| 5,333,861 A | | 8/1994 | Mills | |
| 5,358,276 A | | 10/1994 | Lane, Jr. | |
| 5,395,674 A | | 3/1995 | Schmidt et al. | |
| 5,400,296 A | | 3/1995 | Cushman et al. | |
| 5,435,619 A | * | 7/1995 | Nakae et al. | 296/187.12 |
| 5,444,926 A | | 8/1995 | Allen et al. | |
| 5,471,905 A | * | 12/1995 | Martin | 89/36.02 |
| 5,472,761 A | | 12/1995 | Goldberg et al. | |
| 5,499,814 A | | 3/1996 | Lu | |
| 5,573,824 A | | 11/1996 | Klocek et al. | |
| 5,667,895 A | | 9/1997 | Jenkner | |
| 5,679,439 A | | 10/1997 | Schmidt et al. | |

(Continued)

FOREIGN PATENT DOCUMENTS

JP    57172848 A    10/1982

(Continued)

*Primary Examiner*—Robert A Siconolfi
*Assistant Examiner*—Mariano Sy
(74) *Attorney, Agent, or Firm*—Henricks, Slavin & Holmes LLP

(57) ABSTRACT

Force diversion apparatus, methods and devices including the same result in rotational motion being imparted to an impacting object.

5 Claims, 7 Drawing Sheets

U.S. PATENT DOCUMENTS

| | | | |
|---|---|---|---|
| 5,753,061 A | 5/1998 | Rudy | |
| 5,766,094 A | 6/1998 | Mahaffey et al. | |
| 5,826,350 A | 10/1998 | Wallerstein | |
| 5,848,782 A | 12/1998 | Hein et al. | |
| 5,863,261 A | 1/1999 | Eggiman | |
| 5,914,163 A | 6/1999 | Browne | |
| 5,916,664 A | 6/1999 | Rudy | |
| 5,965,249 A | 10/1999 | Sutton et al. | |
| 5,997,077 A * | 12/1999 | Siebels et al. | 296/187.12 |
| 6,001,030 A | 12/1999 | Delaney | |
| 6,048,426 A | 4/2000 | Pratt | |
| 6,155,617 A | 12/2000 | Kuenzel | |
| 6,193,615 B1 | 2/2001 | Hirota | |
| 6,334,818 B1 | 1/2002 | Cameron et al. | |
| 6,390,932 B1 | 5/2002 | Kosmatka et al. | |
| 6,447,871 B1 | 9/2002 | Hawkins | |
| 6,523,872 B2 | 2/2003 | Breed | |
| 6,547,280 B1 * | 4/2003 | Ashmead | 280/751 |
| 6,641,893 B1 | 11/2003 | Suresh et al. | |
| 6,668,989 B2 | 12/2003 | Reid et al. | |
| 6,685,243 B1 | 2/2004 | Evans | |
| 6,830,793 B2 | 12/2004 | Hawkins et al. | |
| 6,946,180 B2 | 9/2005 | Hawkins | |
| 7,070,030 B2 * | 7/2006 | Etcheverry | 188/371 |
| 7,367,898 B2 | 5/2008 | Hawkins et al. | |
| 2002/0172783 A1 | 11/2002 | Hawkins et al. | |
| 2005/0009623 A1 | 1/2005 | Dickinson | |
| 2006/0154746 A1 | 7/2006 | Hagood et al. | |
| 2006/0191403 A1 * | 8/2006 | Hawkins et al. | 89/36.05 |

FOREIGN PATENT DOCUMENTS

| | | |
|---|---|---|
| JP | 04218445 A | 8/1992 |

\* cited by examiner

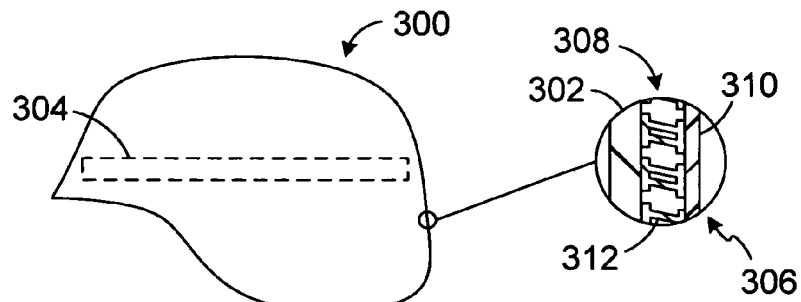
FIG. 16
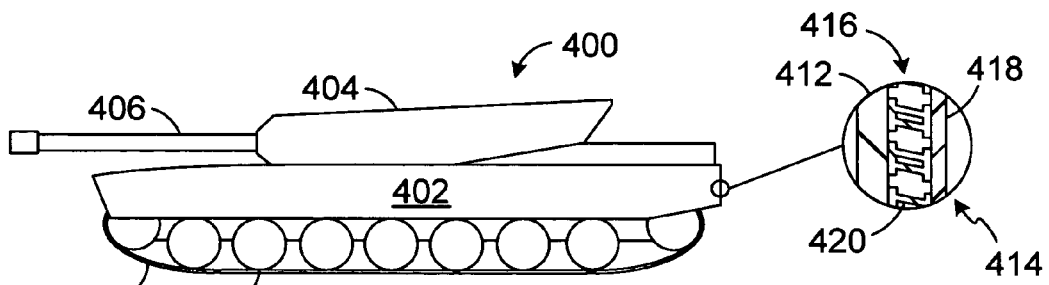
FIG. 17
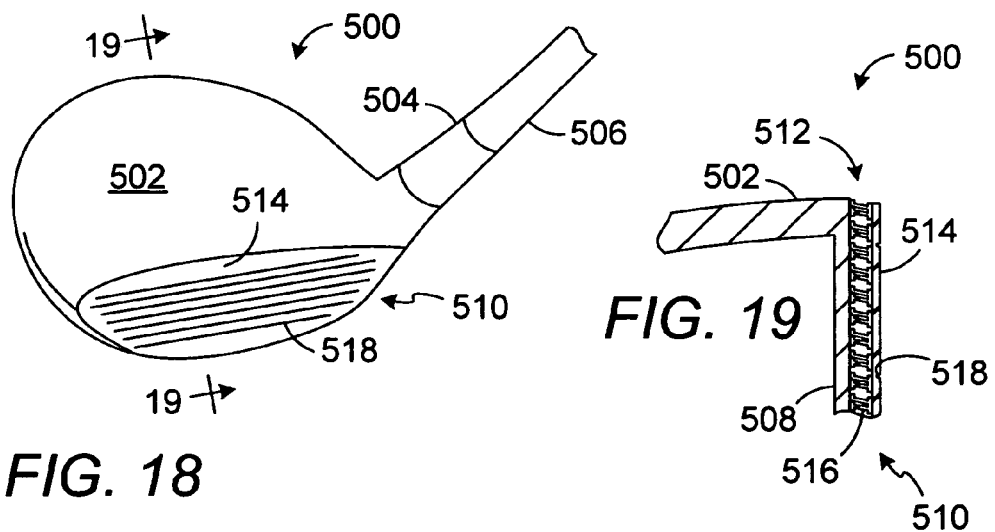
FIG. 18
FIG. 19

FORCE DIVERSION APPARATUS AND METHODS

CROSS-REFERENCE TO RELATED APPLICATIONS

This application is related to concurrently filed U.S. application Ser. No. 11/066,114, entitled "Force Diversion Apparatus and Methods and Devices Including the Same."

BACKGROUND OF THE INVENTIONS

Over the years, a wide variety of devices have been introduced for the purpose of absorbing some or all of the forces associated with collisions (or "impacts") between objects. As used herein, the term "object" includes both inanimate objects, e.g. a projectile, and animate objects, e.g. a human being or portion of a human body. Examples of these devices include helmets and energy absorbing automobile bumpers. Other devices have been introduced for the purpose of preventing one object from penetrating another during a collision. Examples of these devices include bullet-proof vests and vehicle armor. Although the aforementioned devices are generally useful, the present inventors have determined that it would be desirable to provide methods and apparatus which handle collision-associated forces in other ways.

SUMMARY OF THE INVENTIONS

The present inventors have determined that there are many instances where it would be desirable to redirect forces during a collision. Such redirection may be instead of, or in addition to, the absorption of forces and the prevention of penetration. Areas where it is desirable to redirect impact forces include, but are not limited to, protective body equipment, vehicle armor, automobile passenger and pedestrian safety, and sports equipment.

An apparatus in accordance with one exemplary implementation of a present invention includes a plurality of machines configured to convert compression force to shear force and a layer of material operably connected to the plurality of machines that spreads the compression forces associated with the impact with an object over the plurality of machines. The layer of material connected to the plurality of machines may also be configured to control the dynamic motion of the apparatus.

A method of making an apparatus configured to impart a predetermined rotation to an object in accordance with one exemplary implementation of a present invention includes providing a force conversion portion and selecting a force spreading portion that, when combined with the force conversion portion, will result in an apparatus period that is related to the object period in such a manner that the predetermined rotation will be imparted by the apparatus in response to the apparatus/object impact.

A method of absorbing compression forces imparted to a surface by an impacting object in accordance with one exemplary implementation of a present invention includes converting at least some compression forces into shear forces while the object is in contact with the surface and imparting a rotational force to the object while the object is in contact with the surface.

An apparatus for imparting a predetermined rotational motion to an object in response to an apparatus/object impact in accordance with one exemplary implementation of a present invention includes a force conversion portion that deflects in response to the apparatus/object impact in a first direction with a first lateral component and a force spreading portion associated with the force conversion portion. The force conversion portion and the force spreading portion together define an apparatus period and the relationship between the object period and the apparatus period results in the predetermined rotational motion being imparted to the object in response to the apparatus/object impact.

A device for protecting the body from a force in accordance with one exemplary implementation of a present invention includes a wearable portion and a force diversion apparatus associated with the wearable portion. The force diversion apparatus may include a force conversion portion configured to redirect at least a portion of the force and a force spreading portion operably connected to force conversion portion.

A vehicle system in accordance with one exemplary implementation of a present invention includes a vehicle with an exterior and a force diversion apparatus positioned over at least some of the exterior. The force diversion apparatus may include a force conversion portion configured to redirect at least a portion of a force associated with a projectile impacting the force diversion apparatus and a force spreading portion operably connected to force conversion portion.

A sports implement in accordance with one exemplary implementation of a present invention includes an impact device and a force diversion apparatus on the impact device. The force diversion apparatus may include a force conversion portion configured to redirect at least a portion of a force associated with an object impacting the force diversion apparatus and a force spreading portion operably connected to force conversion portion.

An A-pillar assembly in accordance with one exemplary implementation of a present invention includes an A-pillar and a force diversion apparatus positioned over at least some of the A-pillar. The force diversion apparatus may include a force conversion portion configured to redirect at least a portion of a force associated with an object impacting the force diversion apparatus and a force spreading portion operably connected to force conversion portion.

An automobile bumper assembly in accordance with one exemplary implementation of a present invention includes an automobile bumper and a force diversion apparatus positioned over at least some of the automobile bumper. The force diversion apparatus may include a force conversion portion configured to redirect at least a portion of a force associated with an object impacting the force diversion apparatus and a force spreading portion operably connected to force conversion portion.

BRIEF DESCRIPTION OF THE DRAWINGS

Detailed description of exemplary embodiments of the inventions will be made with reference to the accompanying drawings.

FIG. 16 is a side view of a helmet in accordance with one embodiment of a present invention.

FIG. 17 is a side view of a tank in accordance with one embodiment of a present invention.

FIG. 18 is a partial perspective view of a golf club in accordance with one embodiment of a present invention.

FIG. 19 is a partial section view taken along line 19-19 in FIG. 18.

DETAILED DESCRIPTION OF THE EXEMPLARY EMBODIMENTS

Figure 1:
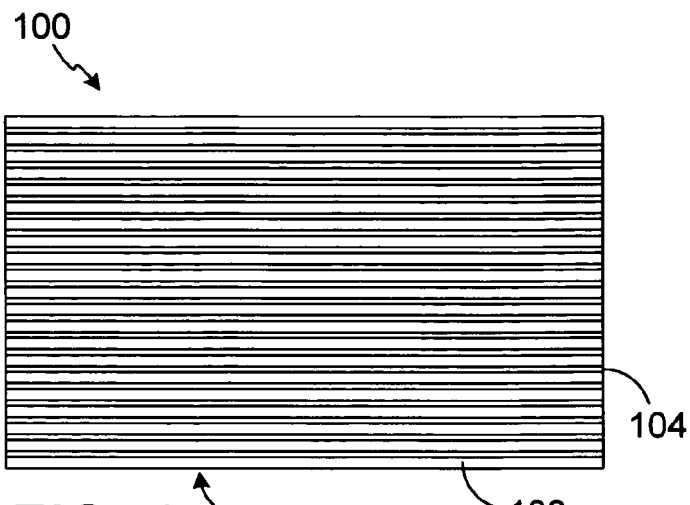
FIG. 1 is a rear view of a force diversion apparatus in accordance with one embodiment of a present invention.
Figure 3A:
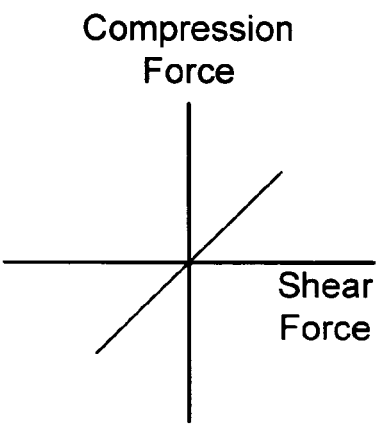
FIG. 3A is a graph illustrating the manner in which the present force diversion apparatus converts compression force into shear force.
Figure 2:
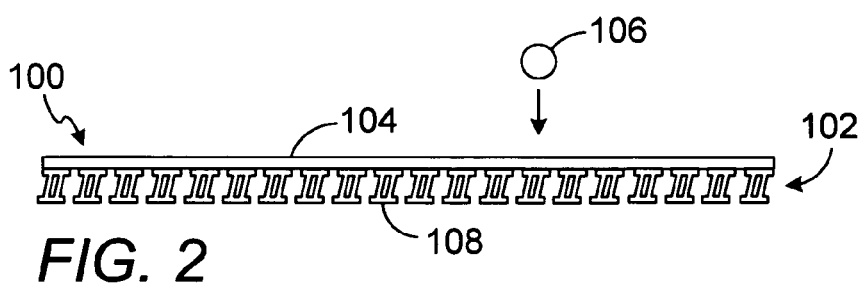
FIG. 2 is a side view of the force diversion apparatus illustrated in FIG. 1.
Figure 3B:
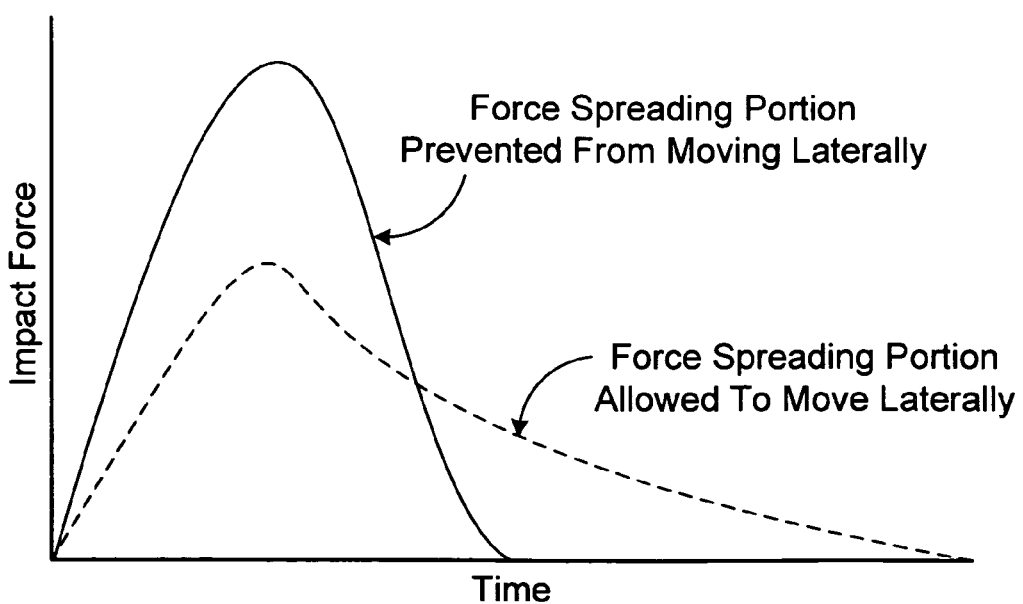
FIG. 3B is a graph illustrating impact force versus time.

The following is a detailed description of the best presently known modes of carrying out the inventions. This description is not to be taken in a limiting sense, but is made merely for the purpose of illustrating the general principles of the inventions. It is noted that detailed discussions of aspects of devices that are not pertinent to the present inventions, such as the inner workings of automobiles and tanks, have been omitted for the sake of simplicity.

Turning to FIGS. 1-3B, a force diversion apparatus 100 in accordance with one embodiment of a present invention includes a force conversion portion 102 and a force spreading portion 104. The force conversion portion 102 converts compression forces into shear forces (note FIG. 3A), thereby causing the force spreading portion 104 to move in a generally downward and lateral direction when the force diversion apparatus is struck by a moving object 106. As a result, the force diversion apparatus 100 imparts lateral motion to the object 106, thereby turning a direct impact into a glancing blow, and imparts rotational motion to the object, thereby causing the object to spin. The lateral motion also reduces the peak impact force and increases the duration of the impact force, as compared to an otherwise identical structure struck in the same manner by the same object, but not permitted to move laterally. This phenomenon is graphically illustrated in FIG. 3B, which shows the impact associated force on the apparatus as a function of time. The lateral movement occurs in those instances where the object 106 bounces off the force diversion apparatus 100 as well as in those instances where the object passes through the force diversion apparatus.

The force spreading portion 104 spreads the compression force (or "load") associated the impact over a larger area of the force conversion portion 102 than would be the case if the moving object 106 simply struck the force conversion portion directly. This occurs in those instances where the object 106 bounces off the force diversion apparatus 100 as well as in those instances where the object passes through the force diversion apparatus.

The force diversion apparatus 100 may be dynamically tuned for particular applications, i.e. fine tuned to react in a predetermined way in response to a predetermined impact. The fine tuned reaction may, for example, be the rate of deflection in response to the impact. Frequently, although not exclusively, the force spreading portion 104 may be used to perform the dynamic tuning function in the manner described below. By way of example, but not limitation, one implementation of the force diversion apparatus 100 may be configured to respond to the impact associated with a bullet in such a manner that the bullet will rotate 90° as it strikes the apparatus, thereby spreading the impact force of the bullet over a larger surface area. Another implementation of the force diversion apparatus may be configured to protect a passenger's head from the A-pillar in an automobile. Still another implementation of the force diversion apparatus may be configured to impart a predetermined rotation to an object (e.g. a golf ball) that is struck during a sporting event. These and other specific implementations are discussed in greater detail below with reference to FIGS. 8-23.

In the illustrated embodiments, the force diversion apparatus 100 is dynamically tuned in such a manner that lateral movement of the force spreading portion 104 takes place while the impacting object 106 is in contact with the apparatus. The force spreading portion 104 will, due to the configuration of the force conversion portion 102, move laterally in response to the impact and then move back. The amount of time it takes the force spreading portion 104 to move laterally and back is referred to herein as the "period." The amount of time that the object 106 is in contact with the force diversion apparatus 100 prior to bouncing away is also referred to herein as the "period." The amount of time an object takes to pass through the force diversion apparatus 100, in those instances where penetration is the expected outcome of impact, is referred to herein as "penetration time." Accordingly, for the force diversion apparatus 100 to impart lateral motion to the object 106, the period of the force diversion apparatus must be approximately less than or equal to the period of the object or the penetration time.

The force diversion apparatus and objects described above and below may, in those instances where the object bounces off the apparatus, each be analogized to a mass on a spring for the purposes of dynamically tuning the apparatus to react in a predetermined way to a predetermined impact. Here, the period of the object ($\tau_o$) may be represented by the equation $$\tau_o = (2\pi)\sqrt{\frac{m_o}{k_o}}, \text{ where}$$

$m_o$=mass of object and $k_o$=effective spring constant of the object. The period of the force diversion apparatus ($\tau_a$) may be represented by the equation $$\tau_a = (2\pi)\sqrt{\frac{m_a + m_o}{k_a}}, \text{ where}$$

$m_a$=mass of force diversion apparatus, $m_o$=mass of object, and $k_a$=effective spring constant of the force diversion apparatus.

The ultimate rotational velocity (ω) of the object is given by the integral of the rotational acceleration, which is in turn equal to the net torque acting on the body divided by the body's moment of inertia (I). In this analogy, the torque acting on the impacting object arises from the shearing force ($F_s$), under the assumption that the normal contact force passes through the object's center of mass. The shearing force ($F_s$) is a function of the material properties of the force diversion apparatus and the impacting object as well as the angles of the transverse portions of the machine elements (discussed below). More formally, in those instances where the object is a sphere, rotational velocity (ω) of the object is represented by the equation $$\omega = \frac{r_o}{I} \int_0^{\tau_o} F_s dt, \text{ where}$$

$r_o$ is the radius of the object, and the moment of inertia (I) for a sphere may be represented by the equation $$I = \frac{2}{5} m_o r_o^2, \text{ where}$$

$r_o$ is the radius of the object and $m_o$ is the mass of the object. Combining the preceding three equations, an expression for the spin of the object as a function of the shearing force, the object's radius and mass, and the impact period can be calculated as follows:

$$\omega = \frac{5}{2 m_o r_o} \int_0^{\tau_o} F_s dt$$

In this representation, the object is in contact with the force diversion apparatus for a period of time proportional to the period of the object ($\tau_o$). At the same time, the force diversion apparatus moves with the apparatus period ($\tau_a$). If the apparatus period ($\tau_a$) is less than the object period ($\tau_o$), then the material may change direction while it is still in contact with the object, and if the apparatus period ($\tau_a$) is greater than the object period ($\tau_o$), then the object may bounce away prior to the chance in direction. Consequently, the shearing force may change sign causing the ultimate rotational velocity of the object to be in either direction or zero, as is discussed below in the context of FIGS. 4C and 4D.

The equations above show the importance of tuning the force diversion apparatus 100 such that it has the desired properties. To briefly summarize, the object 106 has certain particularly relevant properties (mass, velocity, modulus of elasticity, and moment of inertia), the force conversion portion 102 has certain particularly relevant properties (modulus of elasticity, mass and geometry) and the force spreading portion 104 has certain particularly relevant properties (modulus of elasticity and mass, which is a function of the density and geometry). Each of these properties effect the behavior of the apparatus 100 and, in turn, the object 106. However, the properties of the object 106 are typically set, be it a bullet, a golf ball or any other object. The modulus of elasticity and, to some extent, the mass of the force conversion portion 102 may be adjusted, but this can be relatively difficult. The properties of the force spreading portion 104, on the other hand, can typically be easily adjusted. For example, the mass of the force spreading portion 104 can be easily adjusted by simply adjusting its thickness. Accordingly, the properties of the force spreading portion 104 will typically be used/adjusted during dynamic tuning processes to obtain the desired object behavior.

Although the present inventions are not so limited, the force conversion portion 102 of the exemplary force diversion apparatus 100 includes a plurality of spaced machine elements. The term "machine element" is used herein to refer to a structure which modifies the forces acting upon the force diversion apparatus by diverting the forces in a different direction and, in some instances, absorbing at least part of the forces. The machine elements may, for example, be at least partially semi-rigid and/or may be include one or more deflectable portions, thereby allowing the force diversion apparatus 100 to respond in a predetermined manner when impacted by an object. Although the present inventions are not limited to any particular machine element configuration, the exemplary force diversion apparatus 100 includes a plurality of machine elements 108 which extend from one end of the force spreading portion 104 to the other, are spaced in a direction perpendicular to their length, and have a asymmetrical cross-sectional shape which deflects when the force diversion apparatus 100 is subjected to a compression force.

Figure 4A:
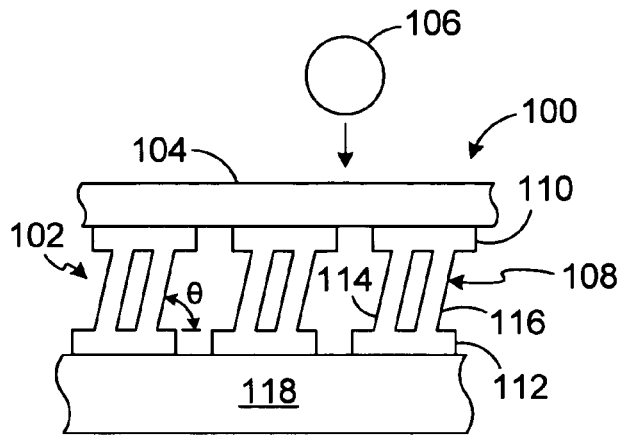
FIGS. 4A-4C are partial side views showing an object striking the force diversion apparatus illustrated in FIG. 1.
Figure 4B:
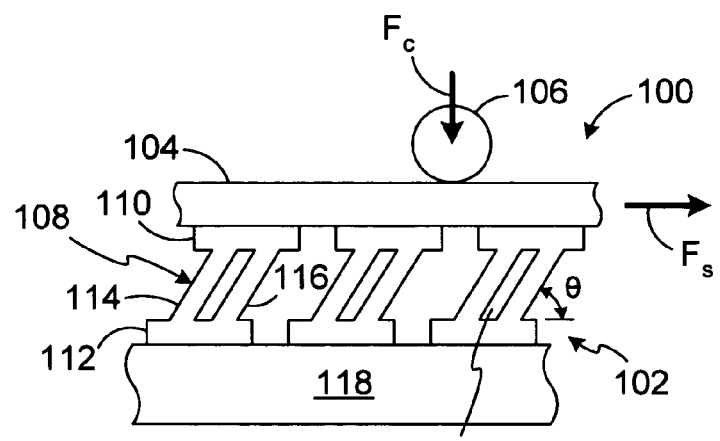

Turning to FIGS. 4A and 4B, the exemplary machine elements 108 are generally Z-shaped and include end portions 110 and 112 and transverse portions 114 and 116 extending between and connecting the end portions. The end portions 110 and 112 are parallel to one another, as are the transverse portions 114 and 116. The transverse portions 114 and 116 are also arranged at an acute angle θ with respect to the end portion 112. The end portion 110 of each machine element 108 is secured to the force spreading portion 104, while the end portions 112 are secured to the structure 118 that is being protected by the force diversion apparatus 100. The transverse portions 114 and 116 flex and act as hinges which allow the end portions 110 and 112 to move relative to one another yet remain substantially parallel, in response to a compression force ($F_c$), as illustrated in FIG. 4B, caused by the object 106 striking the force diversion apparatus 100. More specifically, when the force diversion apparatus 100 is subjected to the compression force ($F_c$), the end portion 110 will pivot about the transverse portions 114 and 116, thereby causing the angle θ to decrease as the force spreading portion 104 moves down and to the right (when in the orientation illustrated in FIGS. 4A and 4B). Accordingly, a portion of the compression force ($F_c$) resulting from the impact of the object 106 is converted into shear force ($F_s$) that is applied to the object while it is in contact with the force diversion apparatus 100.

Figures 4C, 4D:
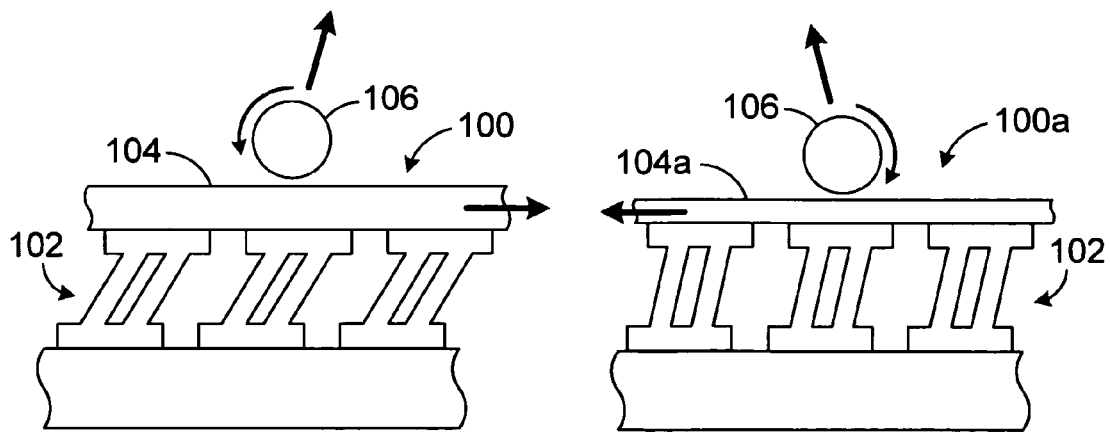
FIG. 4D is a partial side view showing an object striking a force diversion apparatus in accordance with one embodiment of a present invention.

With respect to dynamic tuning, and as illustrated for example in FIG. 4C, if the force spreading portion 106 is moving down and to the right (in the illustrated orientation) when the object leaves the surface, then the force diversion apparatus 100 will impart a force to the right to the object, which results in a counter-clockwise spin. This will typically be the case when the half-period of the force diversion apparatus is greater than the period of the object, as it is in FIG. 4C.

Conversely, a clockwise spin will be imparted to the object 106 force spreading portion is moving in the opposite direction when the object leaves the surface of the force diversion apparatus. This change in spin direction may be accomplished by dynamically tuning the force diversion apparatus 100 (i.e. adjusting some portion thereof) so that it produces this result. For example, the force diversion apparatus 100a illustrated in FIG. 4D is identical to the force diversion apparatus 100 illustrated in FIG. 4C but for the thinner (and lower mass) force spreading portion 104a. The reduction in the mass of the force spreading portion produces a reduction in the period of the force diversion apparatus 100a, as compared to force diversion apparatus 100, that results in the apparatus moving back to the left by the time the object 106 leaves the surface. In other words, the force diversion apparatus 100a has been dynamically tuned to have a full period that is greater than the period of the object 106 and a half-period that is less than the period of the object.

It should be noted that the machine elements 108 are not limited to the configuration and arrangement described above. By way of example, but not limitation, the end portions 110 and/or end portions 112 of adjacent machine elements 108 may be attached to one another. The machine elements 108 may also be spaced longitudinally (i.e. end to end) in addition to laterally. The machine elements 108 may also be stacked so that there will be more than one layer of machine elements. Other shapes may also be employed. For example, Z-shaped machine elements with only a single transverse portion may be employed. Another exemplary machine element configuration, which consists solely of a single transverse structure, is discussed below with reference to FIG. 7.

With respect to materials and manufacturing, the machine elements 108 may be formed from semi-rigid materials using processes such as molding, machining, and extruding. Suitable materials include plastics, such as nylon and polyvinyl chloride, metals, such as aluminum, steel and beryllium copper, and ceramics. The force spreading portion 104 is preferably formed from rigid materials such as steel or aluminum. The materials and dimensions of the force spreading portion 104 and machine elements 108 will, of course depend on the intended application. The force spreading portion 104 and machine elements 108 may be secured to one another with adhesive or other suitable instrumentalities.

Figure 6:
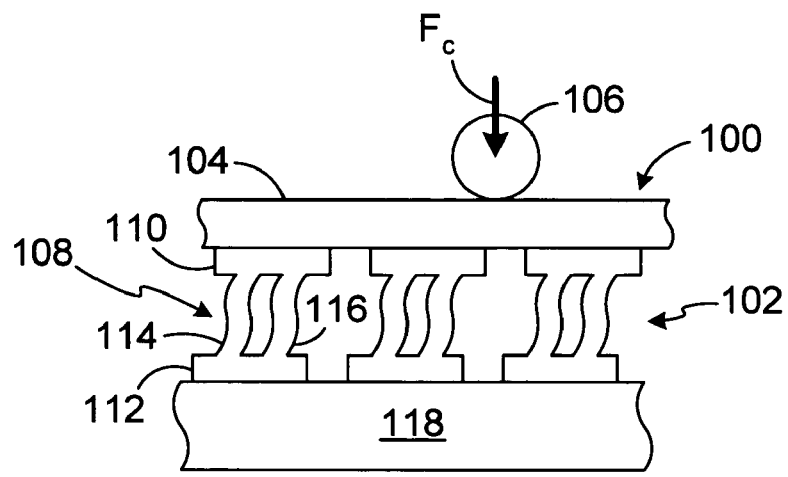
FIG. 6 is a side view illustrating the undesirable buckling of portions of a force diversion apparatus.

As described above, the primary function of the force diversion apparatus 100 is to protect the structure 118 by redirecting the forces associated with the object 106 striking the structure. It is, therefore, important that the machine elements 108 be constructed (i.e. sized, shaped and formed from suitable materials) such that the transverse portions 114 and 116 are flexible enough to pivot in the manner illustrated in FIGS. 4A and 4B when subjected to a compression force. The transverse portions 114 and 116 must not, however, be so flexible that they buckle in the manner illustrated in FIG. 6 or simply collapse in the pivot direction without offering any meaningful resistance.

Figure 5:
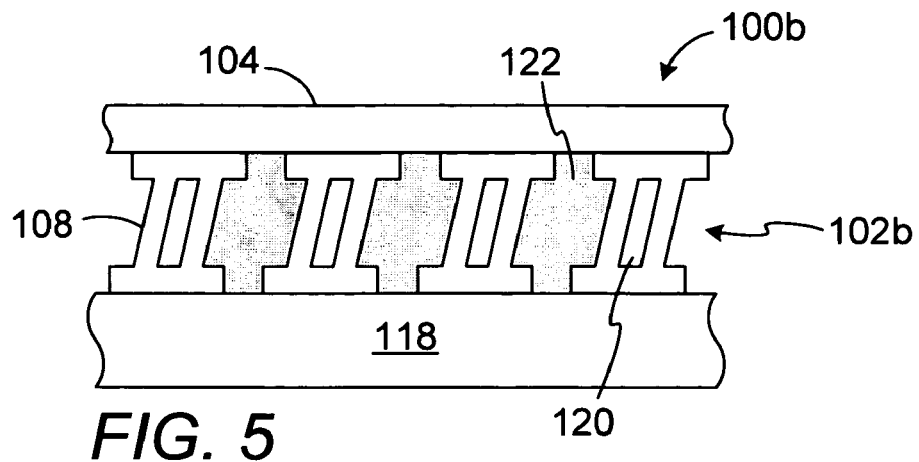
FIG. 5 is a partial side view of a force diversion apparatus in accordance with one embodiment of a present invention.

The construction of the machines 108 is not, however, the only way to insure that the force conversion portion 102 functions in the intended manner. For example, matrix material may be positioned between some or all of the machine elements 108 and/or within some or all the internal cavities 120 (note FIGS. 4B and 5) defined by the end portions 110 and 112 and the transverse portions 114 and 116. The force diversion apparatus 100b illustrated in FIG. 5, for example, includes a force conversion portion 102b with a matrix material 122 between each of the machine elements 108. The matrix material 122 supports the transverse portions 114 and 116 in such a manner the machine elements can flex in the manner illustrated in FIGS. 4A and 4B, but will not buckle in the manner illustrated in FIG. 6, when an object strikes the force diversion apparatus. The matrix material 122 carries some of the applied load associated with the impact of the object and also serves as an elastic foundation for the transverse portions 114 and 116 which stores strain energy during the flexing of the machine elements 108. Although the matrix material 122 may be any suitable fluid or solid, preferred materials include natural rubber and rubber-like materials, such as polyurethane, silicone, Neoprene and Latex, with a lower modulus of elasticity than the machine elements.

Figure 7:
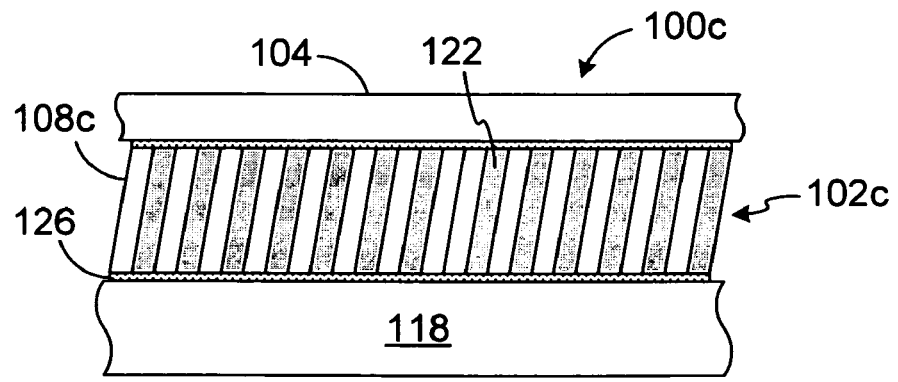
FIG. 7 is a partial side view of a force diversion apparatus in accordance with one embodiment of a present invention.
Figure 8:
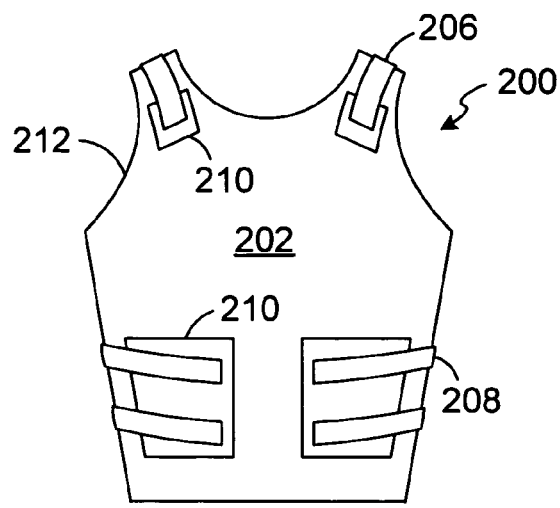
FIG. 8 is a front view of a bullet-proof vest in accordance with one embodiment of a present invention.
Figure 9:
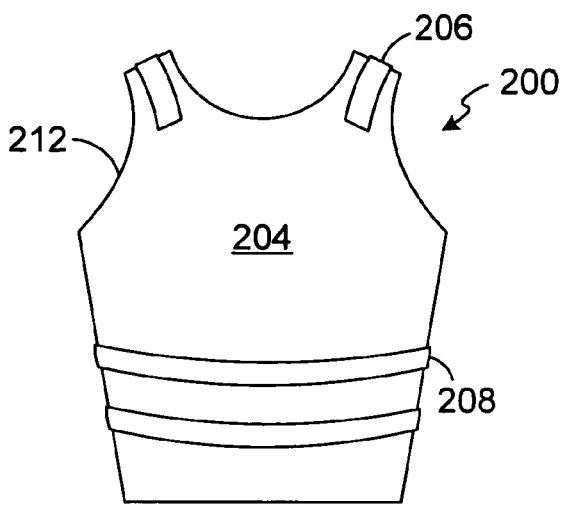
FIG. 9 is a rear view of the bullet-proof vest illustrated in FIG. 8.
Figure 10:
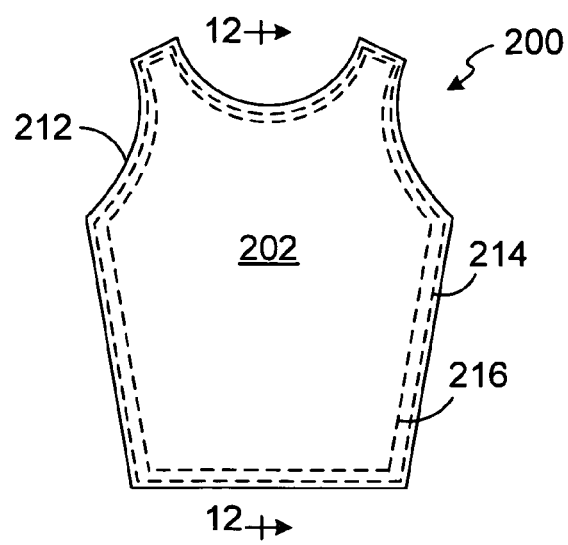
FIG. 10 is a front view of the bullet-proof vest illustrated in FIG. 8 with the exemplary fastening arrangement removed.

The use of matrix material also facilitates the various alternative configurations of the force conversion portion in a force diversion apparatus. Turning to FIG. 7, the force conversion portion 102c in the exemplary force diversion apparatus 100c consists of alternating layers of matrix material 122 and machine elements 108c, which have a higher modulus of elasticity than the matrix material. The machine elements 108c may be formed from the same material as the machine elements 108, e.g. plastics such as nylon and polyvinyl chloride, metals such as aluminum, steel and beryllium copper, and ceramics. A vulcanization process may be used to secure the layers of matrix material 122 to the machine elements 108c and adhesive 126 may be used to secure to the force conversion portion 102c to the force spreading portion 104 and to the structure 118.

It should also be noted that any of the exemplary force diversion apparatus illustrated in FIGS. 1-7 may be incorporated into any of the exemplary implementations of the inventions described below with reference to FIGS. 8-23.

One exemplary application of force diversion apparatus in accordance with the present inventions is protective gear for the human body. Such gear includes any article that can be worn by a human to protect some or all of the human body from the forces associated with being struck by an object, shock waves from an explosion, etc. Typical areas of use for such protective gear include, but are not limited to, body armor for military/law enforcement purposes and sports equipment. Two examples of such protective gear are bullet-proof vests and helmets, which are described below with reference to FIGS. 8-16. Other examples of such devices include baseball catcher's masks, hockey masks, and knee and elbow pads.

As illustrated for example in FIGS. 8-13, a bullet-proof vest 200 in accordance with one embodiment of a present invention includes a front portion 202 and a back portion 204 that are sized and shaped such that they together cover the torso of the wearer. The front and back portions 202 and 204 are adjustably secured to one another by shoulder straps 206 and waist straps 208. Although, the present bullet-proof vest 200 is not limited to and particular fastening arrangement, the shoulder and waist straps 206 and 208 are secured to back portion 204 with stitching and are secured to the front portion 202 with hook and loop fastener tape such as Velcro® 210 that is located on the underside of the straps (not shown) and the surface of the front portion. The exteriors of the front and back portions 202 and 204 each preferably include two main structures—an outer vest shell 212 with a pocket 214 and a protective pad 216. It should be noted that, instead of the exemplary single pocket and pad arrangement, the vest shell may include a plurality of smaller pockets that receive a plurality of smaller pads. In either case, the outer vest shell 212 may be a conventional bullet-proof vest outer shell material such as a washable fabric.

Figure 11:
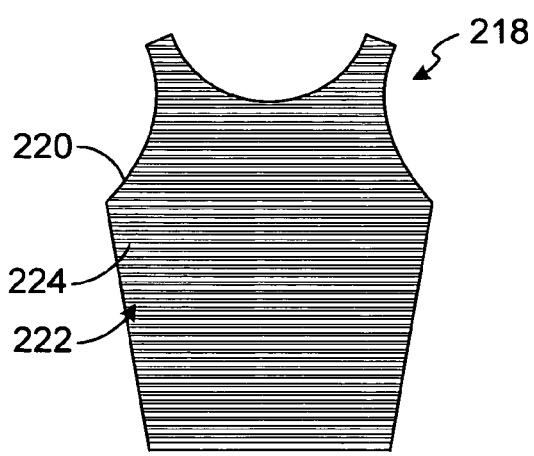
FIG. 11 is a rear view of an exemplary force diversion apparatus that may be incorporated into the bullet-proof vest illustrated in FIG. 8.
Figure 12:
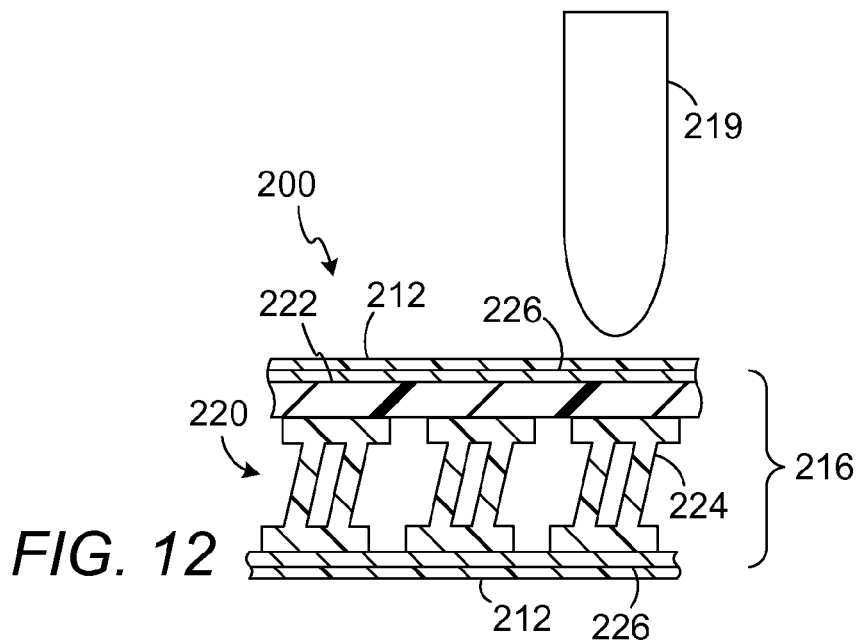
FIGS. 12 and 13 are partial side views showing a bullet striking the bullet-proof vest illustrated in FIGS. 8-11.
Figure 13:
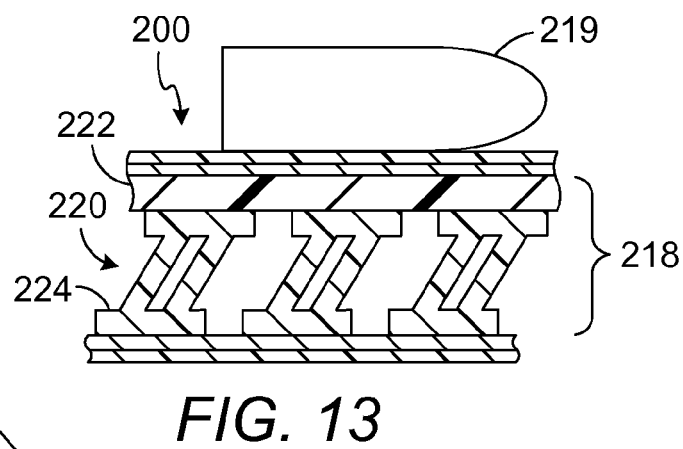
Figure 14:
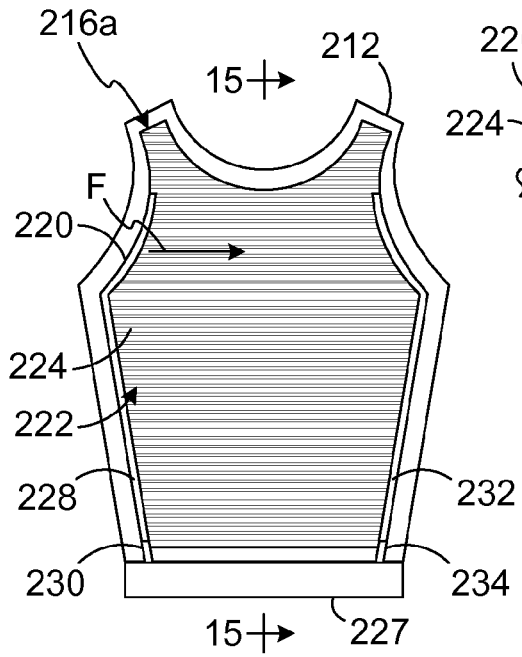
FIG. 14 is a front view of the interior of a portion of a bullet-proof vest in accordance with one embodiment of a present invention.
Figure 15:
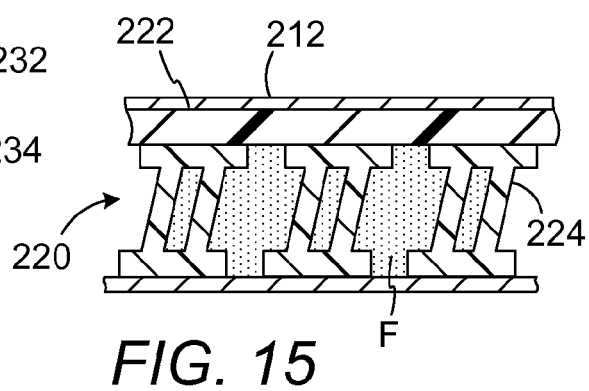
FIG. 15 is a section view taken along line 15-15 in FIG. 14.

Referring more specifically to FIGS. 11-13, the protective pad 216 includes a force diversion apparatus 218 that is configured to redirect the forces associated with a bullet 219 and, more particularly, that is configured to rotate the bullet 90° as it strikes the bullet-proof vest 200. As a result, the force associated with the bullet impact is spread over a larger surface area (i.e. the surface area along the length of the bullet) than the surface area would have been absent rotation (i.e. the surface area of the point). The force diversion apparatus 218 is similar to the force diversion apparatus 100 in that the apparatus 218 includes a force conversion portion 220 and a force spreading portion 222 that operate in the manner described above. The force conversion portion 220 includes a plurality of spaced machine elements 224 that operate in the manner described above, while the force spreading portion 222 is preferably a layer of Kevlar® or other suitable material that will prevent the bullet 219 from penetrating the protective pad 216. In the illustrated embodiment, the force diversion apparatus 218 is located within a fabric enclosure 226 that allows the pad 216 to be easily removed from the shell 212.

Bullet-proof vests and other protective gear for the human body in accordance with the present inventions may also be provided with cooling apparatus. As illustrated for example in FIGS. 14 and 15, a protective pad 216a is provided with a pump and fluid reservoir apparatus ("pump") 227 that pumps fluid F through and between the individual machine elements 224. To that end, the protective pad 216a includes an inlet passage 228 that is connected to an outlet tube 230 on the pump 227, and an outlet passage 232 that is connected to an inlet tube 234 on the pump. The fluid F, such as water, will travel through and between the machine elements 224 from the inlet passage 228 to the outlet passage 232, thereby drawing heat from the wearer's body.

The fluid F also supports the machine elements 224 when the protective pad 216 is stuck by a bullet. More specifically, fluid tends to become much stiffer when there is an attempt to move it very quickly. Thus, when a bullet strikes the protective pad 216a, the shearing action will cause the modulus of the fluid F to momentarily increase approximately 1000 times, thereby momentarily stiffening the force conversion portion 220.

Another example of protective gear in accordance with the present inventions is the helmet 300 illustrated in FIG. 16. The exemplary helmet 300 includes a convention shell 302, which may be formed from Kevlar® or other suitable materials, and suspension system 304 that positions the helmet on the wearer's head. The helmet 300 also includes a force diversion apparatus 306 that is configured to redirect the forces associated with a bullet or other object and reduce peak impact. More particularly, the force diversion apparatus 306 is preferably configured to rotate the bullet 90° as it strikes the helmet 300, thereby spreading the force associated with the bullet impact over a larger surface area that it would have been spread over absent rotation. The force diversion apparatus 306 includes a force conversion portion 308 and a force spreading portion 310 that operate in the manner described above. The force conversion portion 308 includes a plurality of spaced machine elements 312 that operate in the manner described above, while the force spreading portion 310 is preferably a layer of Kevlar® or other suitable material.

The present inventions also have application in the area of armor for vehicles such as tanks, light vehicles, helicopters, planes and automobiles. One example of such a vehicle is the tank 400 illustrated in FIG. 17. The exemplary tank 400 is an otherwise conventional M1A1 battle tank with a hull 402, a turret 404, a cannon 406, wheels 408 and tracks 410. The hull 402 and turret 404 are provided with armor 412 which is typically a ceramic and steel composite. In order to provide additional protection from anti-tank projectiles, which are typically quite brittle and come straight at tanks, the exemplary tank 400 is also provided with a force diversion apparatus 414 that covers hull 402 and turret 404. The force diversion apparatus 414 includes a force conversion portion 416 and a force spreading portion 418 that operate in the manner described above. The force conversion portion 416 includes a plurality of spaced machine elements 420 that operate in the manner described above, while the force spreading portion 418 is preferably a layer of steel, ceramic, Kevlar® or other suitably penetration resistant material. When an anti-tank projectile strikes the force diversion apparatus 414, the configuration of the machine elements 420 will cause the force spreading portion 418 to move in the manner described above with reference to FIGS. 4 and 5. Such movement will impart enough shearing force on the tip of the brittle projectile to cause it to shatter, which greatly reduces the effect of the projectile on the tank.

As noted above, the present inventions include sporting goods-type protective gear. The present inventions also have application in the area of sporting goods-type implements. Such implements typically include a portion that is held by the user and a portion that strikes, or is struck by, an object. Although the present inventions are not limited to any particular type of implement, the golf club 500 illustrated in FIGS. 18 and 19 is one example. The exemplary golf club 500 includes a club head 502 with a hosel 504 that receives a shaft 506. The forward facing portion 508 of the club head 502 is provided with a force diversion apparatus 510. The force diversion apparatus 510 includes a force conversion portion 512 and a force spreading portion 514 that operate in the manner described above. The force conversion portion 512 includes a plurality of spaced machine elements 516 that operate in the manner described above. The force spreading portion 514 acts as the club head strike plate and, accordingly, is preferably a metal plate with score lines 518.

The force diversion apparatus 510 may be configured to impart a predetermined spin on a golf ball that is struck by the exemplary golf club 500 by dynamically tuning the force diversion apparatus 510. For example, the thickness (and mass) of the force spreading portion 514 may be selected such that the force diversion apparatus 510 imparts the desired spin when the club head 502 strikes the ball.

In addition to the aforementioned golf club 500, other exemplary sporting goods-type implements that may include a force diversion apparatus include, but are not limited to ping pong paddles, pool cues, and string-less tennis rackets.

Other applications of the present inventions include automobile safety and, more specifically, passenger safety and pedestrian safety. Although there is a wide variety of passenger and pedestrian safety applications, and although the present inventions are not limited to any particular applications, two exemplary applications are A-pillars and bumpers. One example of an otherwise conventional automobile that incorporates the present A-pillar and bumper safety features is generally represented by reference numeral 600 in FIG. 20.

Figure 20:
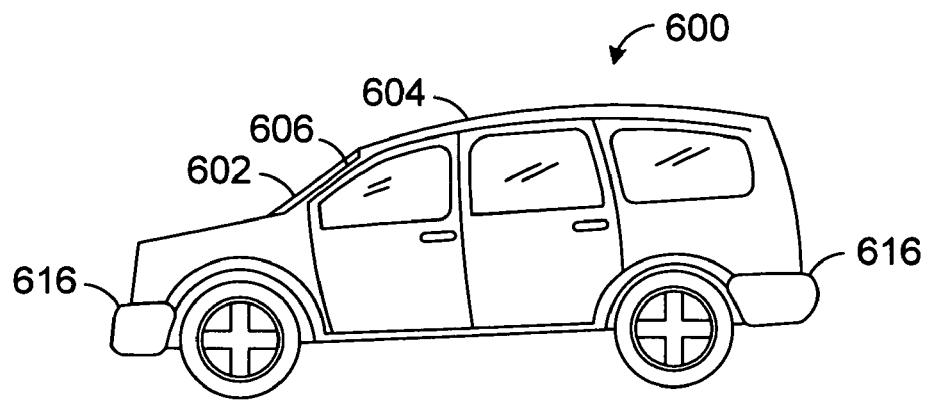
FIG. 20 is a side view of an automobile in accordance with one embodiment of a present invention.
Figure 22:
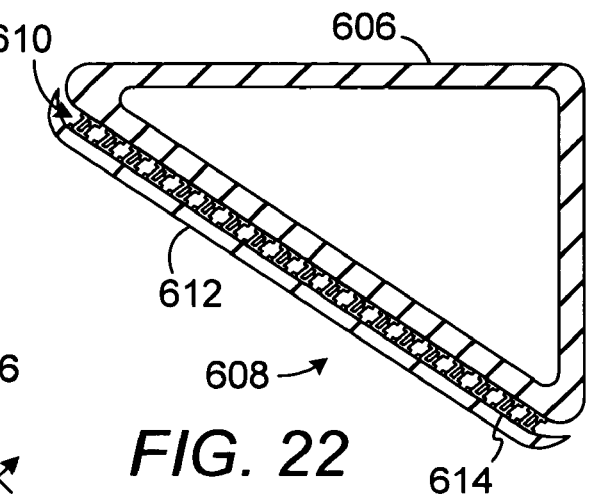
FIG. 22 is a section view taken along line 22-22 in FIG. 21.
Figure 21:
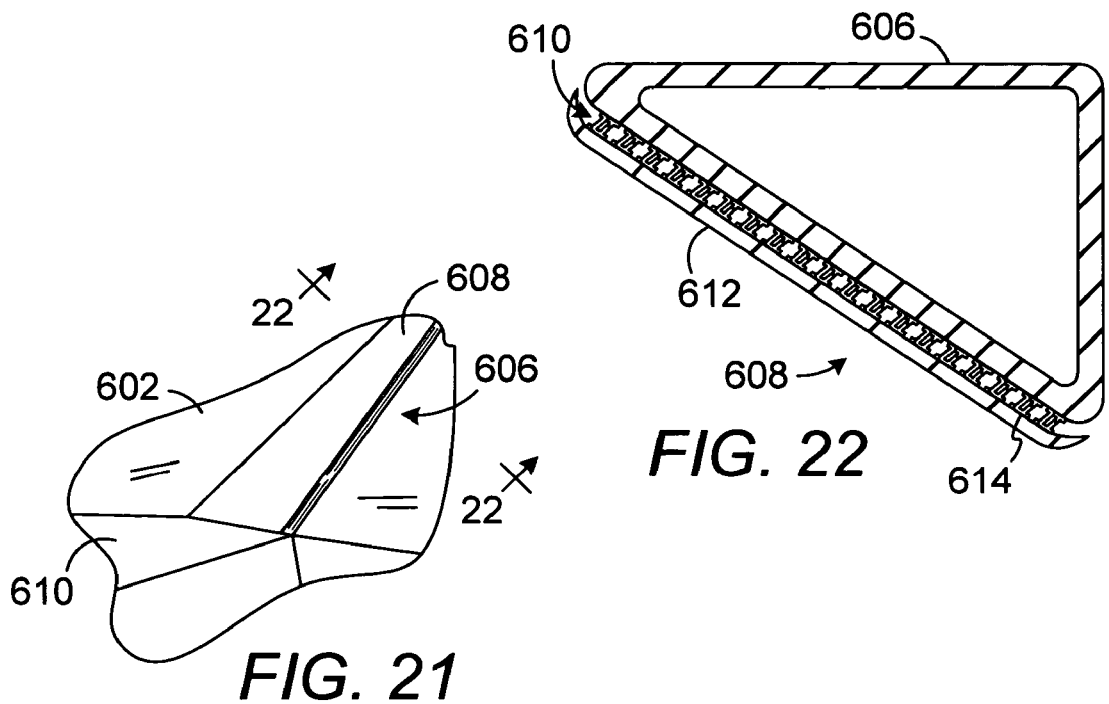
FIG. 21 is a perspective view of a portion of the interior of the automobile illustrated in FIG. 20.

Referring first to FIGS. 20-22, the exemplary automobile 600 includes a windshield 602, a roof 604 and A-pillars 606 on either side of the windshield. As known to those of skill in the art, A-pillars are the roof supports designed to support a large portion of the vehicle's weight in the event of a roll-over and, accordingly, must be relatively stiff. This stiffness represents a danger to passengers in that their heads may strike this relatively stiff structure during an accident. In order to protect passengers from this hazard, the exemplary automobile 600 is provided with force diversion apparatus 608 that are coextensive with each of the A-pillars 606 (i.e. extend from the roof 604 to the dashboard 610) within the passenger compartment. The force diversion apparatus 608 includes a force conversion portion 610 and a force spreading portion 612 that operate in the manner described above. The force conversion portion 610 includes a plurality of spaced machine elements 614 that operate in the manner described above. Accordingly, when a passenger's head strikes one of the A-pillars 606, some of the impact forces will be redirected, thereby reducing the magnitude of the blow to the passenger's head.

Figure 23:
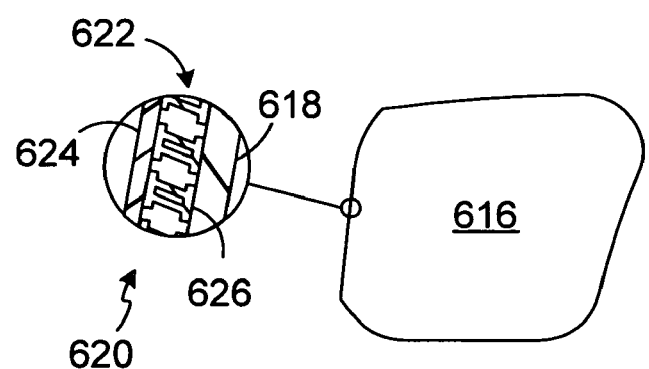
FIG. 23 is a side view of an automobile bumper in accordance with one embodiment of a present invention.

Turning to FIG. 23, the exemplary automobile 600 also includes bumpers 616 with an internal bumper structure 618 and a force diversion apparatus 620 that covers some or the entire exterior surface of the internal bumper structure. The internal bumper structure 618 is a conventional automobile bumper that is mounted on the automobile in the conventional manner. The force diversion apparatus 620 includes a force conversion portion 622 and a force spreading portion 624 that operate in the manner described above. The force conversion portion 622 includes a plurality of spaced machine elements 626 that operate in the manner described above.

Although the inventions disclosed herein have been described in terms of the preferred embodiments above, numerous modifications and/or additions to the above-described preferred embodiments would be readily apparent to one skilled in the art. It is intended that the scope of the present inventions extend to all such modifications and/or additions and that the scope of the present inventions is limited solely by the claims set forth below.

We claim:

1. A method of making an apparatus configured to impart a predetermined rotation to an object having a period in response to an apparatus/object impact, comprising:

providing a force conversion portion;

selecting a force spreading portion that, when combined with the force conversion portion, will result in an apparatus period that is related to the object period in such a manner that the predetermined rotation will be imparted by the apparatus in response to the apparatus/object impact; and combining the force spreading portion with the force conversion portion.

2. A method as claimed in claim 1, wherein providing a force conversion portion comprises providing a force conversion portion that moves in response to the apparatus/object impact in a first direction with a first lateral component during a first half of the apparatus period and moves in a second direction with a second lateral component, opposite the first lateral component, during a second half of the apparatus period.

3. A method as claimed in claim 2, wherein selecting a force spreading portion comprises selecting a force spreading portion that, when combined with the force conversion portion, will result in the first half of the apparatus period being greater than the object period.

4. A method as claimed in claim 2, wherein selecting a force spreading portion comprises selecting a force spreading portion that, when combined with the force conversion portion, will result in the first half of the apparatus period being less than the object period.

5. A method as claimed in claim 1, wherein combining the force spreading portion with the force conversion portion comprises securing the force spreading portion to force conversion portion.

* * * * *